(12) United States Patent
Kajiyama

(10) Patent No.: US 11,338,474 B2
(45) Date of Patent: May 24, 2022

(54) INJECTION MOLDING METHOD

(71) Applicant: SUBARU CORPORATION, Tokyo (JP)

(72) Inventor: Tsutomu Kajiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 188 days.

(21) Appl. No.: 16/778,378

(22) Filed: Jan. 31, 2020

(65) Prior Publication Data
US 2020/0307029 A1    Oct. 1, 2020

(30) Foreign Application Priority Data
Mar. 28, 2019   (JP) .............................. JP2019-062996

(51) Int. Cl.
*B29B 13/08* (2006.01)
*B29C 71/04* (2006.01)
*B29C 45/00* (2006.01)

(52) U.S. Cl.
CPC .......... *B29B 13/08* (2013.01); *B29C 45/0005* (2013.01); *B29C 71/04* (2013.01); *B29C 2045/0008* (2013.01)

(58) Field of Classification Search
CPC . B29C 45/568; B29C 45/585; B29C 35/0261; B29C 71/04; B29C 45/0005; B29C 2045/0008; B29C 2045/1702; B29C 2045/0039; B29B 13/08
See application file for complete search history.

(56) References Cited

U.S. PATENT DOCUMENTS 5,705,201 A  *  1/1998  Ibar ..................... B29C 45/1704
                                                264/572
2017/0001354 A1* 1/2017  Nobuta ............... B29C 45/0005

FOREIGN PATENT DOCUMENTS

JP              5794481 B2   10/2015

* cited by examiner

*Primary Examiner* — Francisco W Tschen
*Assistant Examiner* — Elisa H Vera
(74) *Attorney, Agent, or Firm* — Troutman Pepper Hamilton Sanders LLP

(57) ABSTRACT

An injection molding method uses a die with a cavity into which molten resin is to be injected to fill the cavity. The die has a shape that causes the molten resin injected into the cavity to branch and merge. The injection molding method includes providing bubbles into the molten resin before the molten resin is injected, generating fine bubbles with the provided bubbles before the molten resin is injected, injecting the molten resin containing the fine bubbles, and bursting the fine bubbles of the injected molten resin containing the fine bubbles in a merging location where the molten resin merges.

16 Claims, 7 Drawing Sheets

INJECTION MOLDING METHOD

CROSS-REFERENCE TO RELATED APPLICATIONS

The present application claims priority from Japanese Patent Application No. 2019-062996 filed on Mar. 28, 2019, the entire contents of which are hereby incorporated by reference.

BACKGROUND

The disclosure relates to an injection molding method to fabricate a product by injecting molten resin into a die.

Many resin products are fabricated by an injection molding method. In the injection molding method, molten resin is injected into a closed die to fill the die and is cooled and solidified before a resultant product is taken out. If a location is included in which the molten resin injected into the die branches and merges again, a weld line may be formed on a merging surface at the time of cooling and problems such as imperfection in external appearance and decrease in strength may be caused.

SUMMARY

An aspect of the disclosure provides an injection molding method that uses a die with a cavity into which molten resin is to be injected to fill the cavity. The die has a shape that causes the molten resin injected into the cavity to branch and merge. The injection molding method includes providing bubbles into the molten resin before the molten resin is injected, generating fine bubbles with the provided bubbles before the molten resin is injected, injecting the molten resin containing the fine bubble, and bursting the fine bubbles of the injected molten resin containing the fine bubbles in a merging location where the molten resin merges.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Example Embodiment

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
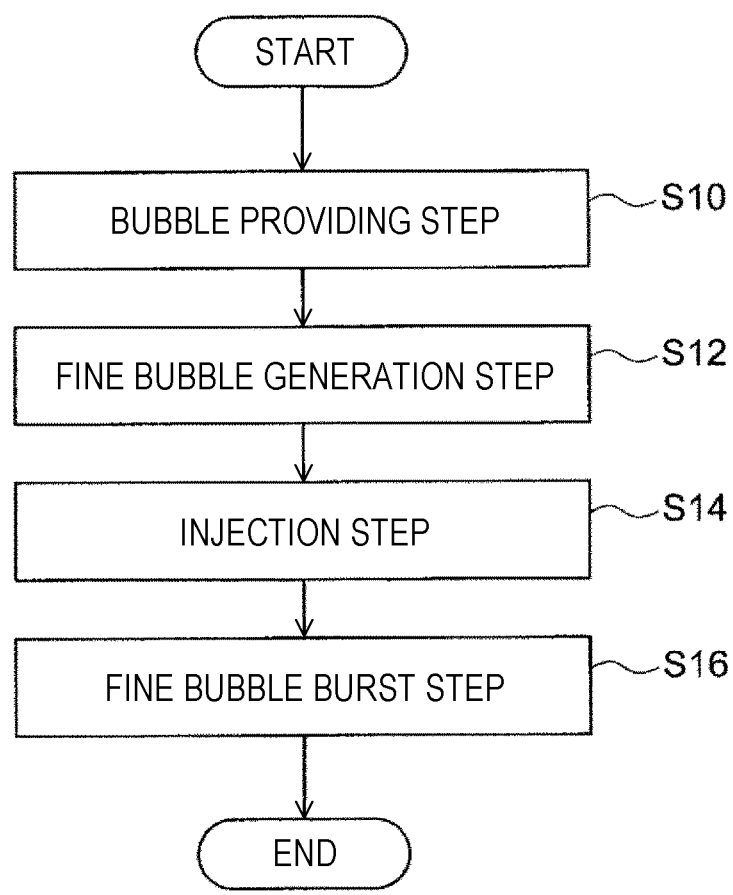
FIG. 1 is a flow chart illustrating an injection molding method according to an embodiment of the disclosure.

FIG. 1 is a flow chart illustrating an injection molding method according to an embodiment of the disclosure. The method includes a bubble providing step (step S10), a fine bubble generation step (step S12), an injection step (step S14), and a fine bubble burst step (step S16). Among a series of product fabrication steps, the flow chart depicts the steps from the timing at which molten resin is injected into a die to the timing at which molten resin that has branched merges in a merging location while omitting steps such as preparation and removal.

Figure 2:
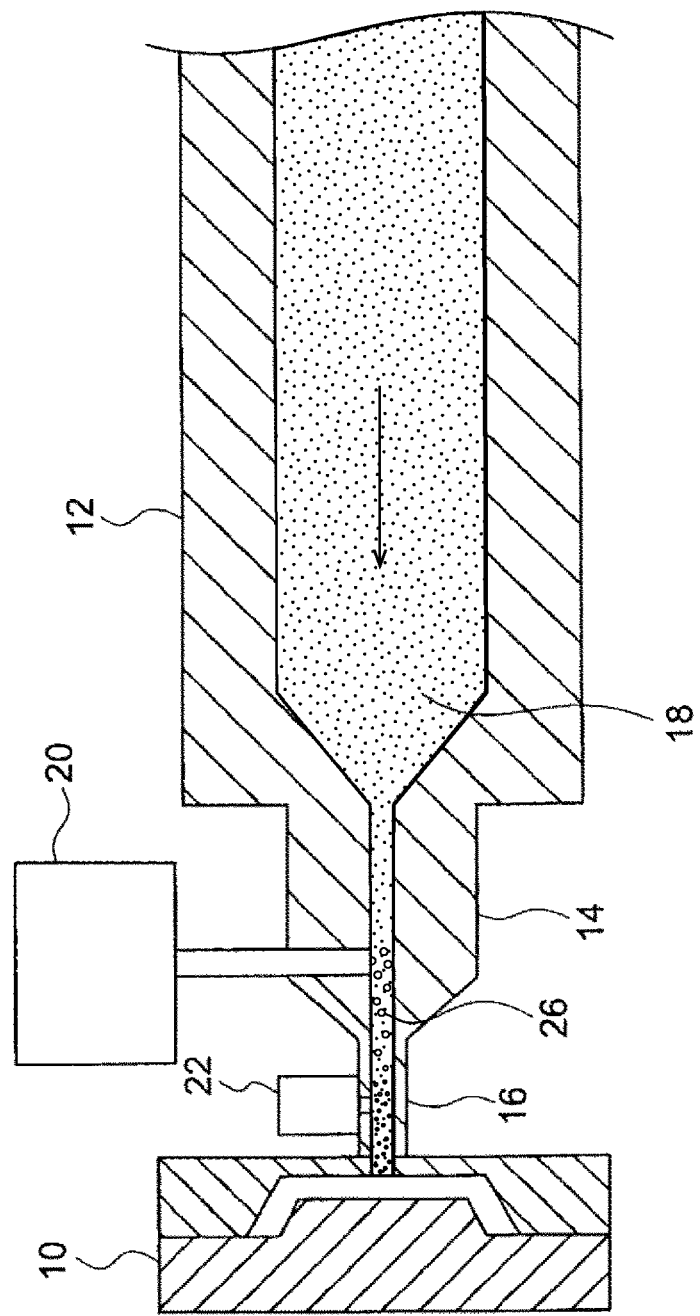
FIG. 2 is a schematic explanatory diagram for the bubble providing step in FIG. 1.

First, the bubble providing step (step S10) is performed. In this step, when molten resin is injected into a die, bubbles are provided into the resin. FIG. 2 is a schematic explanatory diagram for the bubble providing step. FIG. 2 schematically illustrates how an extrusion barrel 12 is coupled to a die 10 and molten resin 18 passes through a distal end portion 14 and a nozzle 16 of the extrusion barrel 12 to be injected into the die 10. A cylinder 20 is coupled to an intermediate portion in the distal end portion 14 of the extrusion barrel 12 to provide bubbles 26. The bubbles 26 are provided into the molten resin 18 from the cylinder 20. The total amount of the bubbles 26 provided depends on the size of a product and the like, and is approximately 1 cc or less if it is a resin product with a thickness of approximately 3 mm.

Figure 3:
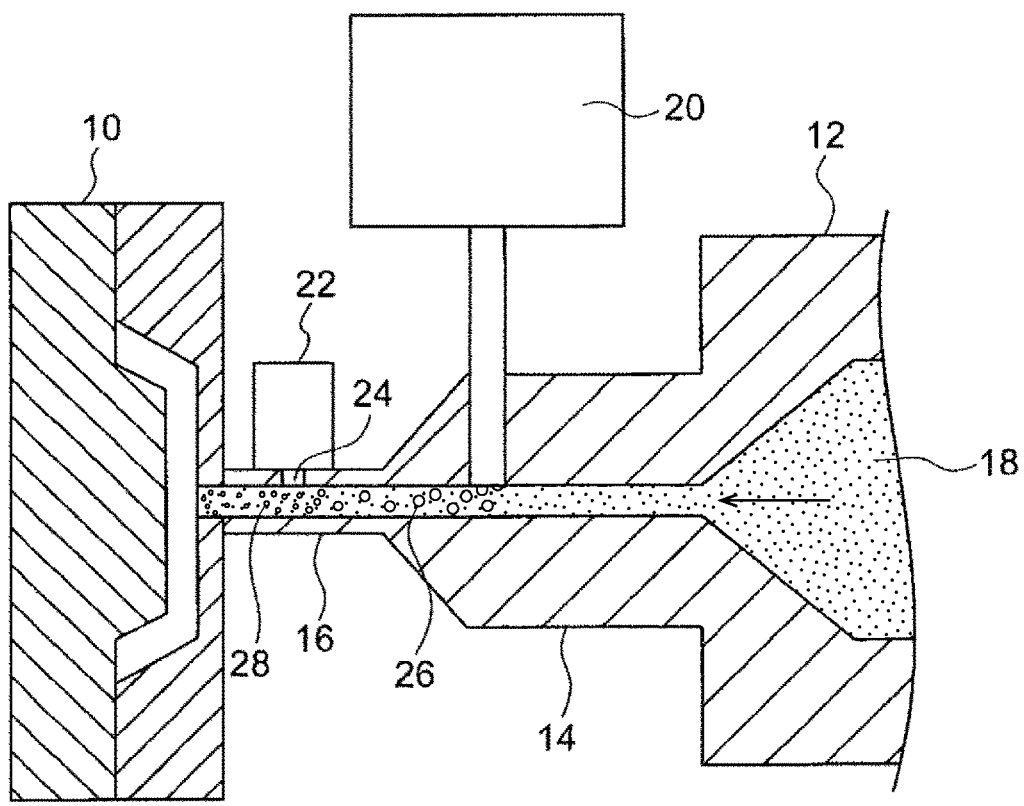
FIG. 3 is a schematic explanatory diagram for the fine bubble generation step in FIG. 1.

Subsequently, the fine bubble generation step (step S12) is performed. FIG. 3 is a schematic explanatory diagram for the fine bubble generation step. An ultrasonic wave generator 22 is disposed on a portion of the nozzle 16 in the distal end portion 14 of the extrusion barrel 12, which is immediately before a location in which the nozzle 16 is coupled to the die 10. An ultrasonic oscillator 24 is mounted in an inner wall surface of a passage in the nozzle 16, through which the molten resin 18 passes. When an electric signal is given to the ultrasonic oscillator 24 and the ultrasonic oscillator 24 oscillates, ultrasonic waves are applied to the molten resin 18 containing the bubbles 26.

In the present embodiment, the ultrasonic waves range in frequency from 1 KHz to 1 MHz and the maximum amplitude is 100 μm or lower. The ultrasonic waves cause the bubbles 26 to repeat compression and expansion to generate fine bubbles 28. The diameter of the fine bubble is 100 μm or smaller. FIG. 3 illustrates the fine bubbles 28 through exaggeration. In actuality, the fine bubbles 28 are generated in a high amount, of which visual recognition is impossible. This configuration enables fine bubbles to be generated easily and efficiently. In addition, the amount of fine bubbles and the like can be controlled by adjusting the frequency and amplitude of the ultrasonic waves.

Figure 4A:
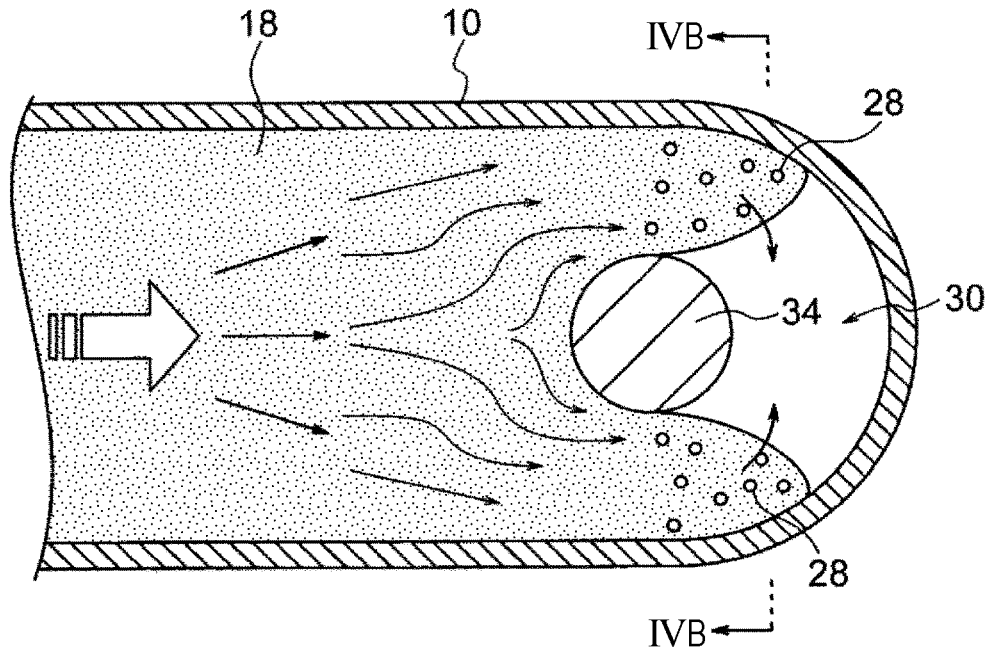
FIGS. 4A to 4C are schematic explanatory diagrams for the injection step in FIG. 1.
Figure 4B:
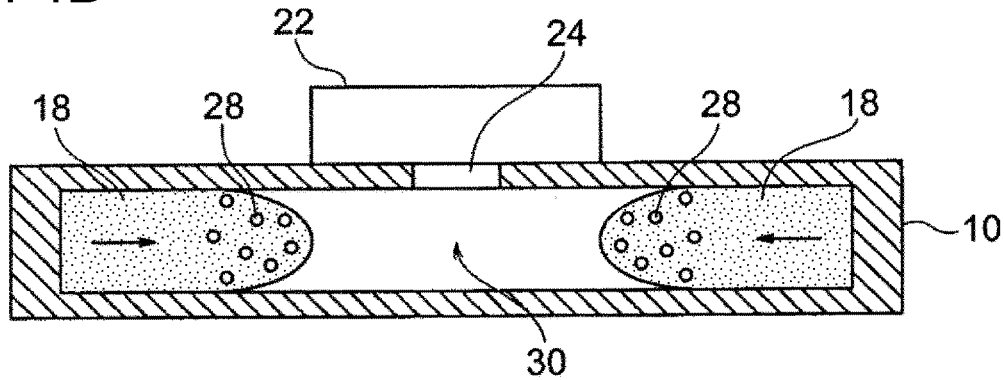
Figure 4C:
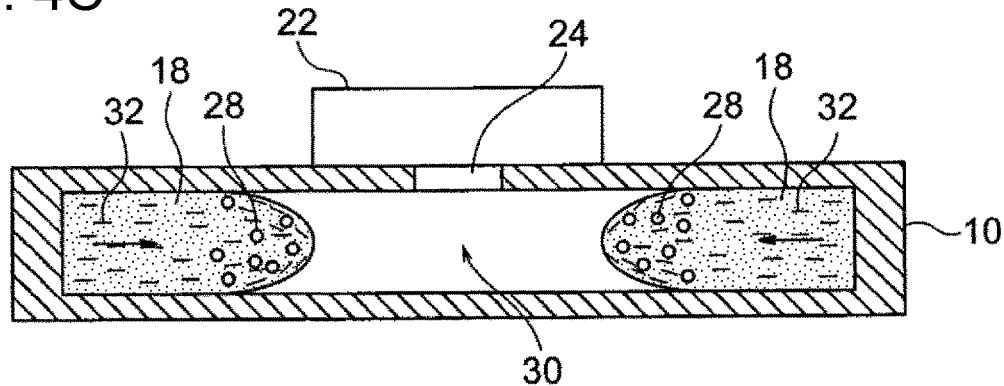

Subsequently, the injection step (step S14) is performed. The molten resin 18 that contains the fine bubbles 28 generated in the fine bubble generation step (step S12) is injected into the die 10. The fine bubbles 28 are present in a distal end portion of the resin 18 that has been injected and moves. After the injection, the molten resin 18 containing the fine bubbles 28 passes through a sprue, a runner, a gate, and so on such that the die is filled with the molten resin 18. A location in which the molten resin 18 merges in the die 10 can be grasped experimentally and theoretically in advance. FIGS. 4A to 4C are schematic explanatory diagrams for the injection step and illustrates how the molten resin 18 branches at a pin 34 for forming a hole and merges in a merging location 30. The fine bubbles 28 are contained in distal end portions of the resin that branches and moves.

FIG. 4A is a schematic plan cross-sectional view of the die 10 and FIG. 4B is a cross-sectional view along line IVB-IVB in FIG. 4A. FIG. 4C illustrates a case in which the molten resin 18 contains reinforcing fiber (hereinafter referred to as fibrous bodies 32). As illustrated in FIG. 4A, the molten resin 18 that flows in the die 10 is caused to branch at the pin 34 and passes by the pin 34, and then meets (merges) in the merging location 30. The fine bubbles 28 are present in a distal end portion of the resin 18 flowing.

The ultrasonic wave generator 22 is disposed over the merging location 30 of the die 10 and the ultrasonic oscillator 24 is mounted in the inner wall surface of the die 10. The ultrasonic oscillator 24 is configured so that the ultrasonic oscillator 24 can generate ultrasonic waves on reception of an electric signal from the ultrasonic wave generator 22 and apply the ultrasonic waves to the resin 18.

As illustrated in FIG. 4C, the fibrous bodies 32 are approximately parallel to the direction in which the resin 18 flows and, in the distal end portion of the resin 18 flowing, are approximately parallel to the shapes at the distal ends of the resin 18.

Figure 5A:
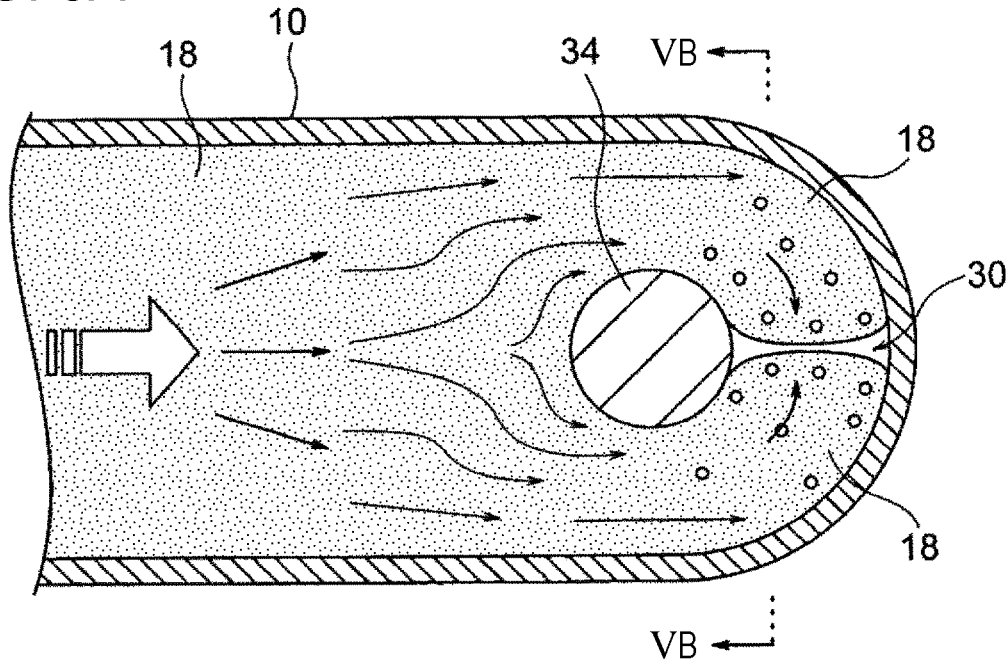
FIGS. 5A to 5C are schematic explanatory diagrams of the fine bubble burst step in FIG. 1.
Figure 5B:
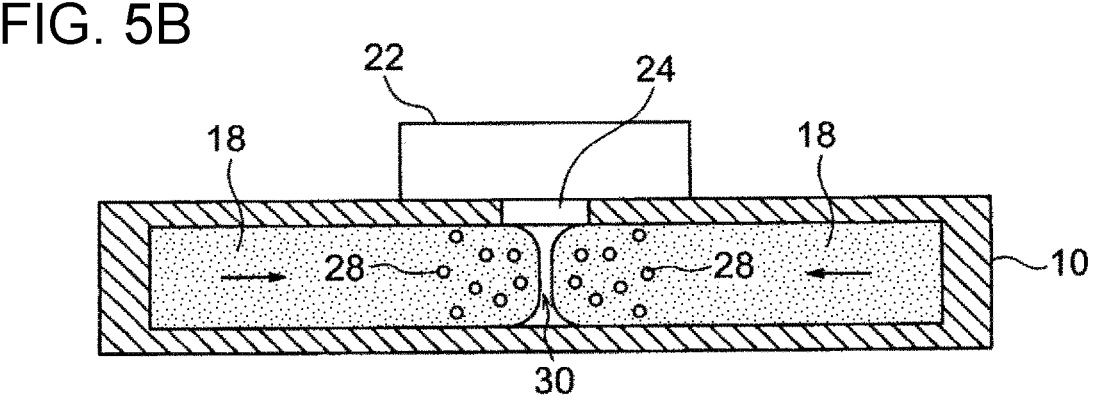
Figure 5C:
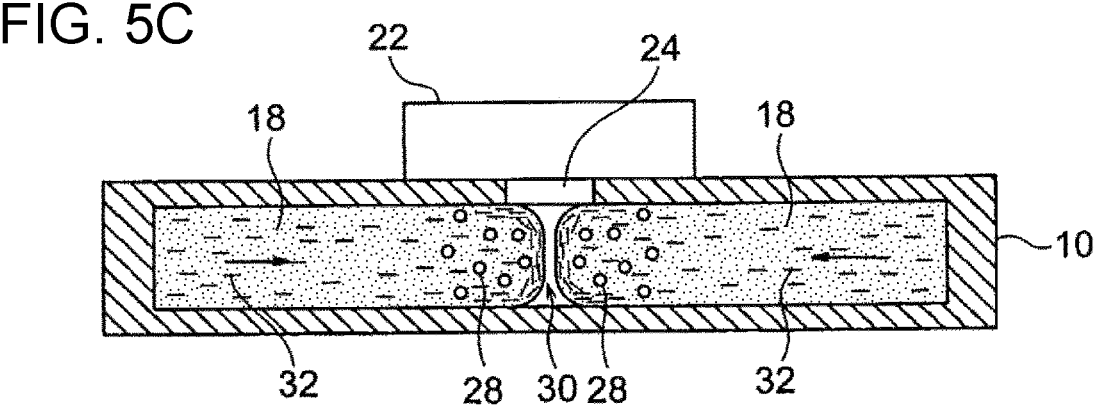

Subsequently, the fine bubble burst step (step S16) is performed. FIGS. 5A to 5C are schematic explanatory diagrams for the fine bubble burst step. FIG. 5A is a schematic plan cross-sectional view of the die 10 and FIG. 5B is a cross-sectional view along line VB-VB in FIG. 5A. FIG. 5C illustrates a case in which the molten resin 18 contains the fibrous bodies 32. The molten resin 18 that has branched at the pin 34 is in a state immediately before merging in the merging location 30. The ultrasonic wave generator 22 is caused to operate in this state and the ultrasonic oscillator 24 applies ultrasonic waves to the molten resin 18. The ultrasonic waves range in frequency from 1 KHz to 1 MHz and the maximum amplitude is 100 µm or lower.

The fine bubbles 28 to which the ultrasonic waves are applied repeats expansion and compression and burst (get squeezed or break up) finally. When a burst occurs, shock waves or jet streams are generated. The shock waves or jet streams cause the resin 18 in the merging location 30 to be stirred mutually and mixed sufficiently. Accordingly, formation of a weld line can be suppressed.

As illustrated in FIG. 5C, if the fibrous bodies 32 are contained, in the merging location 30, the fibrous bodies 32 are oriented approximately parallel to the meeting surfaces in the merging location 30, that is, in the direction approximately orthogonal to the direction in which the molten resin 18 moves. When the fine bubble burst step (step S16) is performed, the energy caused in the burst of the fine bubbles 28 makes the orientation a random orientation. That is, when the fine bubbles 28 burst, the fibrous bodies 32 are oriented randomly without having any directivity because of shock waves or jet streams that occur all around.

Figure 6A:
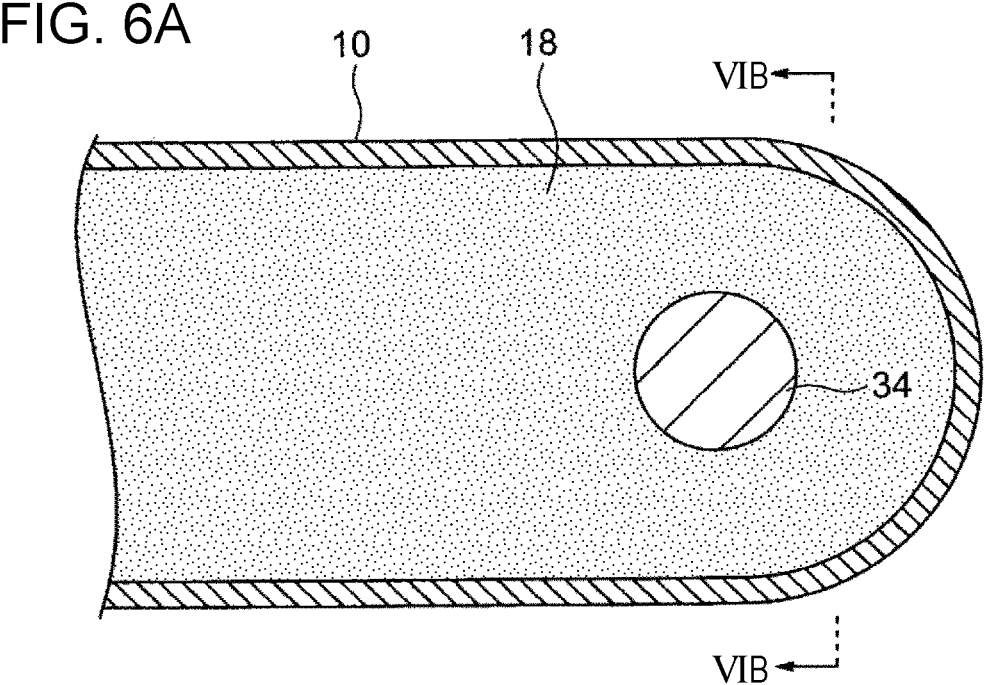
FIGS. 6A to 6C are schematic explanatory diagrams illustrating how the resin changes in a merging location after the bubble burst step of FIGS. 5A to 5C.
Figure 6B:
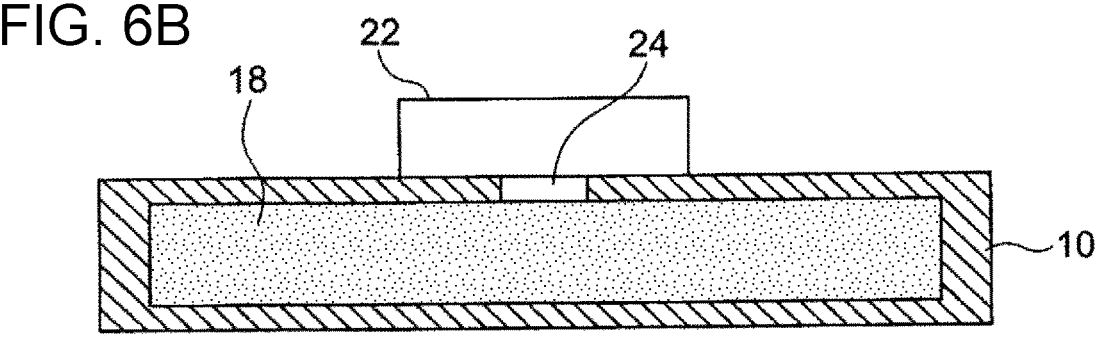
Figure 6C:
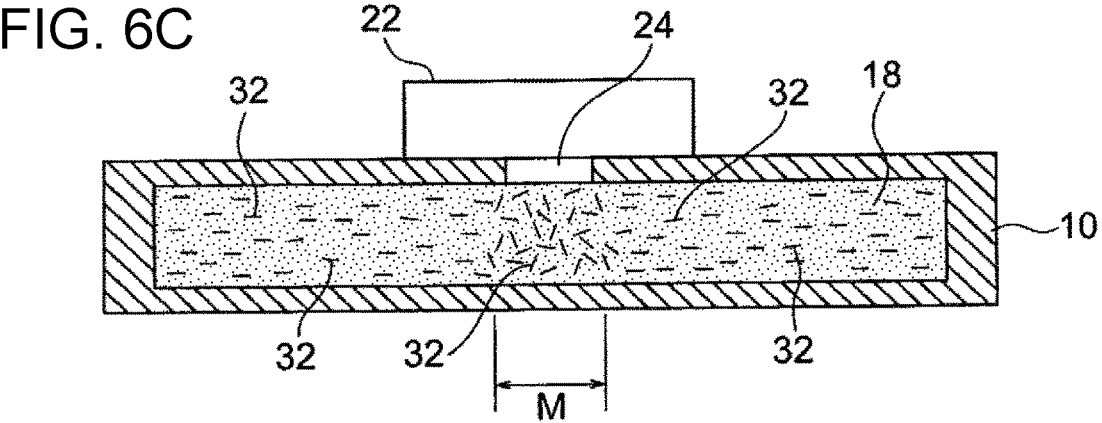

FIGS. 6A to 6C are schematic explanatory diagrams illustrating how the resin 18 seems after the bubble burst step of FIGS. 5A to 5C, which has merged. FIG. 6A is a schematic plan cross-sectional view of the die 10 and FIG. 6B is a cross-sectional view along line VIB-VIB in FIG. 6A. FIG. 6C illustrates a case in which the molten resin 18 contains the fibrous bodies 32. If no weld line is formed as illustrated in FIGS. 6A and 6B and the resin contains the fibrous bodies 32 as illustrated in FIG. 6C, the fibrous bodies 32 are oriented randomly near the meeting surfaces in the merging location 30 and form a random orientation region M. In the present embodiment, the fibrous bodies 32 used are each 1 mm long. Since the fibrous bodies 32 are oriented randomly, decrease in tensile strength can be further suppressed in comparison with a typical case where, on the meeting surfaces, fibrous bodies are oriented perpendicular to the direction in which resin flows.

After that, the resin 18 is cooled and removed from the die 10 to obtain a product. The obtained product exhibits no weld line and is favorable in external appearance while decrease in tensile strength is suppressed, and is highly reliable accordingly.

If the resin 18 to merge contains bubbles, the bubble providing step (step S10) of the flow chart in FIG. 1 can be omitted. That is, depending on a material, bubbles may be contained originally. The bubble providing step is unnecessary in such a case and the ultrasonic wave generator 22 can generate fine bubbles based on the bubbles contained in the material.

The fine bubble generation step (step S12) can also serve as the fine bubble burst step (step S16). That is, the bubbles 26 are provided from the distal end portion 14 of the extrusion barrel 12 in the bubble providing step (step S10) and if the bubble providing location and the merging location 30 of the molten resin 18 are close to each other, the bubbles 26 provided in the bubble providing step (step S10) can flow to the merging location 30 and the fine bubbles 28 based on the bubbles 26 can be generated through the application of ultrasonic waves in the merging location 30 such that the generated fine bubbles 28 can be burst.

In other words, if the bubbles 26 provided in the bubble providing step (step S10) are smoothly delivered to the merging location 30 of the resin 18 that has branched and ultrasonic waves can be applied in the merging location 30, the fine bubble generation step (step S12) can be performed together with the fine bubble burst step (step S16).

In the injection molding method according to the embodiment of the disclosure, in cases where resin that has branched in a die merges, the resin that is molten is caused to contain fine bubbles, the fine bubbles are burst on meeting surfaces, and energy generated is used to stir the molten resin in a merging location so that formation of a weld line can be prevented. It is thus enabled to suppress imperfection in external appearance and decrease in strength due to a weld line. As a result, the reliability of a fabricated resin product can be increased.

The disclosure is not limited to the above-described embodiment but can be changed variously within the scope not departing from the gist of the disclosure. For example, in the bubble providing step, bubbles are provided in a distal end portion of the extrusion barrel but may also be provided near a sprue, a runner, or a gate. Although a pin for forming a hole is taken as an example of what causes resin to branch and merge, the disclosure is not limited to such a case but is applicable to a case where a plurality of gates are included. Further, even if a plurality of locations of branching and merging are included, formation of a weld line can be suppressed in each of the locations by disposing an ultrasonic oscillator in each merging location and adjusting the amount of bubbles to be provided and fine bubbles to be generated.

Comparative Example

Figure 7A:
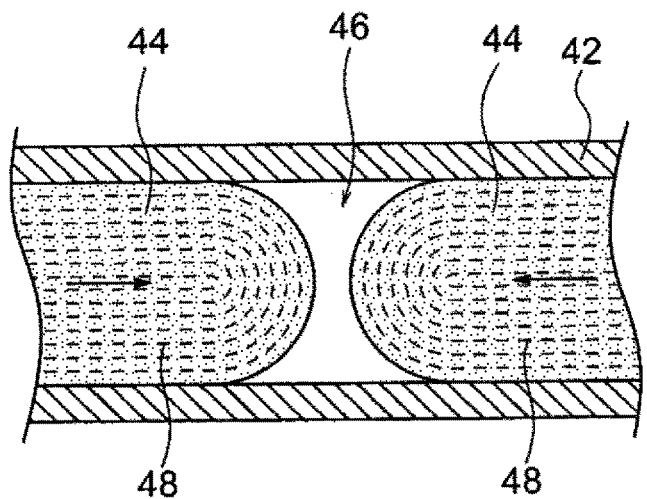
FIGS. 7A to 7C are schematic explanatory diagrams for formation of a weld line.
Figure 7B:
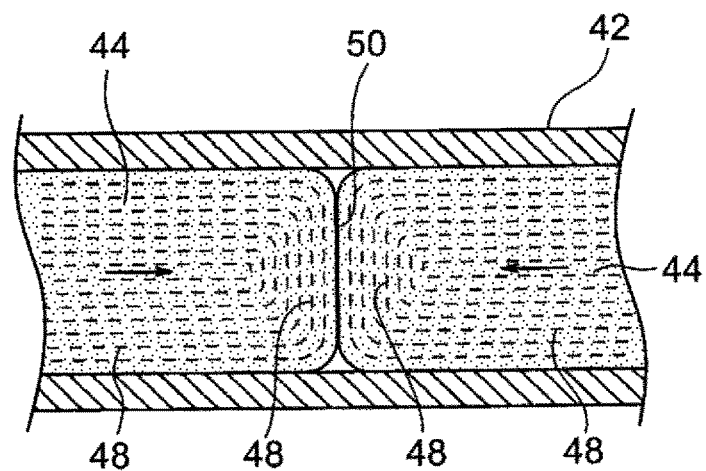
Figure 7C:
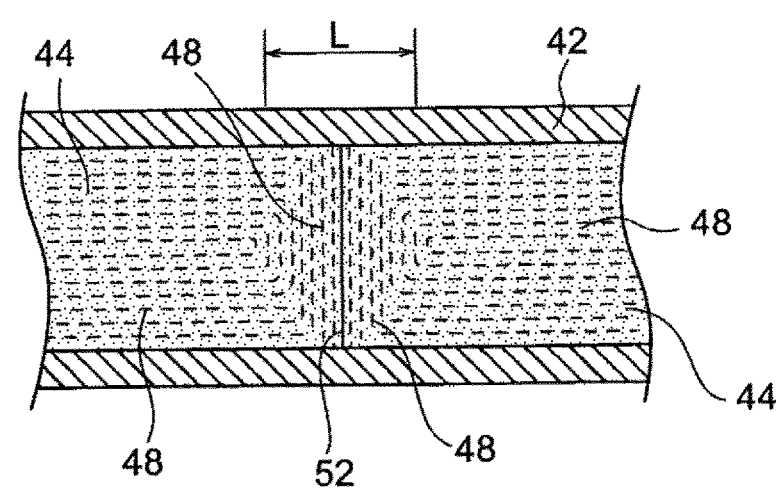

FIGS. 7A to 7C are schematic explanatory diagrams for formation of a weld line. Illustrated is how molten resin 44 injected from an unillustrated gate into a die 42 merges in a merging location 46. The resin 44 contains fibrous bodies 48. The fibrous bodies 48 are illustrated through exaggeration. Such cases in which resin merges in a die may occur if gates as injection inlets for the resin are present in two or more locations or if, for example, a pin or core for forming a hole or the like in a product is present.

As illustrated in FIG. 7A, the resin 44 that has branched in a predetermined location flows toward the merging location 46 to merge again. The fibrous bodies 48 flow approximately along the direction in which the resin 44 flows and in distal end portions of the flowing resin, however, are approximately parallel to the shapes of the surfaces at the distal ends. As illustrated in FIG. 7B, when the resin 44 merges, the resin 44 cannot be mixed together completely and a boundary 50 is caused. The fibrous bodies 48 are oriented approximately parallel to the boundary 50, that is, approximately perpendicular to the direction in which the resin 44 flows. After that, as illustrated in FIG. 7C, when injection pressure is applied and the resin 44 is cooled, an orientation portion L is formed about the boundary 50. The above-described boundary 50 constitutes a weld line 52. In the orientation portion L about the weld line 52, the fibrous bodies 48 are approximately perpendicular to the direction in which the resin flows. As a result, imperfection in external appearance and decrease in strength of a product may be caused.

To prevent such formation of a weld line, for example in Japanese Patent No. 5794481, two resin reservoirs are formed while meeting surfaces in a location where molten resin merges serve as a boundary. A mechanism configured to compress the volume is provided in one of the resin reservoirs and a mechanism configured to expand the volume is provided in the other resin reservoir. By filling the two resin reservoirs with molten resin and then compressing one of the resin reservoirs and expanding the other resin reservoir, promotion of movement of the resin is attempted so that formation of a weld line can be hindered.

In the method of Japanese Patent No. 5794481, the amount by which the resin moves in the merging location is increased and the area of the meeting surfaces is enlarged. However, the resin that has merged cannot be mixed sufficiently. In addition, the extra preparation for mechanisms to expand and compress the volume complicates the apparatus.

Other examples of reviewed measures against weld lines include a method in which the temperature of a die is raised and the solidification of the resin is delayed, a method in which the speed of injection is increased and a solidification layer on a surface is thinned, a method in which the temperature of resin is set to a relatively high value, a method in which the pressure of resin is set to a relatively high value, a method in which a meeting angle is increased, and a method in which a meeting position is shifted at a timing for a gate, which have not yielded satisfactory results.

It is therefore desirable to provide an untypical injection molding method that can suppress the formation of a weld line.

In contrast, in the foregoing embodiment of the disclosure, fine bubbles are generated based on the bubbles provided into molten resin and the resin containing the fine bubbles are caused to flow to a merging location so that the fine bubbles are burst at the time of merging. When a burst occurs, shock waves or jet streams are generated and enormous energy occurs. Accordingly, the resin is stirred sufficiently on the meeting surfaces in the merging location. As a result, occurrence of a weld line on the meeting surfaces can be suppressed.

Further, with a simple principle, the fine bubbles based on the bubbles that have been provided can be generated easily. In addition, the fine bubbles of an amount desired can be generated by adjusting the frequency or amplitude of ultrasonic waves or adjusting the pressure in abrupt pressure application or abrupt pressure reduction.

Moreover, through reception of the ultrasonic waves, the fine bubbles repeat compression and expansion and the fine bubbles burst (get squeezed) finally. When the fine bubbles burst, shock waves or jet streams are generated and enormous energy occurs. The energy enables the resin to be stirred sufficiently in the merging location.

In addition, the generation of the fine bubbles and the burst of the fine bubbles can be performed easily and efficiently since an ultrasonic oscillator is mounted in the inner wall surface of the passage through which the molten resin passes. Also, the burst of the fine bubbles can be controlled by adjusting the frequency and amplitude of the ultrasonic waves.

Furthermore, in the meeting surfaces where the resin merges, the fibrous bodies contained are oriented randomly because of the energy caused in the burst of the fine bubbles. Accordingly, compared with a case where fibrous bodies are oriented approximately perpendicular to the direction in which resin flows in meeting surfaces, decrease in tensile strength can be further suppressed.

The invention claimed is:

1. An injection molding method using a die with a cavity into which molten resin is to be injected to fill the cavity from an extrusion barrel, the die having a shape that causes the molten resin injected into the cavity to branch and merge, the injection molding method comprising:
    providing bubbles into the molten resin by injecting a gas with a predetermined volume into a first passage through which the molten resin flows from a second passage, wherein the first passage communicates the extrusion barrel with the cavity and the second passage is connected to the first passage at a first point;
    generating a set of bubbles by breaking up the bubbles, wherein the breaking up is performed by applying first ultrasonic waves to the molten resin in the first passage, at a location closer to the cavity than the first point;
    injecting the molten resin containing the set of bubbles from the first passage into the cavity; and
    bursting the set of bubbles contained near meeting surfaces of the injected molten resin in a merging location in the cavity where the molten resin merges by applying second ultrasonic waves to the meeting surfaces of the injected molten resin, wherein the application of second ultrasonic waves starts before the molten resin merges in the merging location.

2. The injection molding method according to claim 1, wherein
    a first ultrasonic oscillator that outputs the first ultrasonic waves is mounted in an inner wall surface of the first passage closer to the cavity than the first point, and the applying the first ultrasonic waves is performed by giving a first electric signal to the first ultrasonic oscillator to cause the first ultrasonic oscillator to oscillate.

3. The injection molding method according to claim 2, wherein
the molten resin contains fibrous bodies, and the burst of the set of bubbles causes the fibrous bodies to be oriented randomly in the merging location.

4. The injection molding method according to claim 3, wherein
a second ultrasonic oscillator that outputs the second ultrasonic waves is mounted in an inner wall surface of the merging location of the cavity, and
the applying the second ultrasonic waves is performed by giving a second electric signal to the second ultrasonic oscillator to cause the second ultrasonic oscillator to oscillate.

5. The injection molding method according to claim 4, wherein
diameter of the set of bubbles are 100 μm or smaller.

6. The injection molding method according to claim 3, wherein
diameter of the set of bubbles are 100 μm or smaller.

7. The injection molding method according to claim 2, wherein
a second ultrasonic oscillator that outputs the second ultrasonic waves is mounted in an inner wall surface of the merging location of the cavity, and
the applying the second ultrasonic waves is performed by giving a second electric signal to the second ultrasonic oscillator to cause the second ultrasonic oscillator to oscillate.

8. The injection molding method according to claim 7, wherein
diameter of the set of bubbles are 100 μm or smaller.

9. The injection molding method according to claim 2, wherein
diameter of the set of bubbles are 100 μm or smaller.

10. The injection molding method according to claim 1, wherein
the molten resin contains fibrous bodies, and the burst of the set of bubbles causes the fibrous bodies to be oriented randomly in the merging location.

11. The injection molding method according to claim 10, wherein
a second ultrasonic oscillator that outputs the second ultrasonic waves is mounted in an inner wall surface of the merging location of the cavity, and
the applying the second ultrasonic waves is performed by giving a second electric signal to the second ultrasonic oscillator to cause the second ultrasonic oscillator to oscillate.

12. The injection molding method according to claim 11, wherein
diameter of the set of bubbles are 100 μm or smaller.

13. The injection molding method according to claim 10, wherein
diameter of the set of bubbles are 100 μm or smaller.

14. The injection molding method according to claim 1, wherein
a second ultrasonic oscillator that outputs the second ultrasonic waves is mounted in an inner wall surface of the merging location of the cavity, and
the applying the second ultrasonic waves is performed by giving a second electric signal to the second ultrasonic oscillator to cause the second ultrasonic oscillator to oscillate.

15. The injection molding method according to claim 14, wherein
diameter of the set of bubbles are 100 μm or smaller.

16. The injection molding method according to claim 1, wherein
diameter of the set of bubbles are 100 μm or smaller.

* * * * *